United States Patent
Jeon et al.

(10) Patent No.: US 12,404,360 B2
(45) Date of Patent: Sep. 2, 2025

(54) METHOD OF PREPARING GRAFT COPOLYMER

(71) Applicant: LG CHEM, LTD., Seoul (KR)

(72) Inventors: Tae Young Jeon, Daejeon (KR); Joo Byung Chai, Daejeon (KR); Yu Sung Jung, Daejeon (KR); Jong Beom Kim, Daejeon (KR); Eun Seon Park, Daejeon (KR)

(73) Assignee: LG CHEM, LTD.

( * ) Notice: Subject to any disclaimer, the term of this patent is extended or adjusted under 35 U.S.C. 154(b) by 892 days.

(21) Appl. No.: 17/435,637

(22) PCT Filed: Jul. 21, 2020

(86) PCT No.: PCT/KR2020/009573
§ 371 (c)(1),
(2) Date: Sep. 1, 2021

(87) PCT Pub. No.: WO2021/015526
PCT Pub. Date: Jan. 28, 2021

(65) Prior Publication Data
US 2022/0153899 A1 May 19, 2022

(30) Foreign Application Priority Data

Jul. 24, 2019 (KR) .................. 10-2019-0089775
Jul. 20, 2020 (KR) .................. 10-2020-0089664

(51) Int. Cl.
*C08F 279/04* (2006.01)
*C08F 279/02* (2006.01)
*C08L 55/02* (2006.01)

(52) U.S. Cl.
CPC .......... *C08F 279/04* (2013.01); *C08F 279/02* (2013.01); *C08L 55/02* (2013.01)

(58) Field of Classification Search
CPC ....... C08F 279/04; C08F 279/02; C08L 55/02
See application file for complete search history.

(56) References Cited

U.S. PATENT DOCUMENTS

| | | | |
|---|---|---|---|
| 2011/0224351 A1 | 9/2011 | Mori et al. | |
| 2015/0051333 A1* | 2/2015 | Ahn | C08L 25/12 525/86 |
| 2016/0326362 A1* | 11/2016 | Oh | C08F 279/04 |
| 2017/0008991 A1 | 1/2017 | Watanabe et al. | |
| 2017/0145171 A1* | 5/2017 | Waldie | C08J 5/18 |
| 2017/0190824 A1 | 7/2017 | Ahn et al. | |
| 2019/0185606 A1* | 6/2019 | Jung | C08F 2/44 |

FOREIGN PATENT DOCUMENTS

| | | | |
|---|---|---|---|
| CN | 103254365 A | 8/2013 | |
| CN | 103539899 A | 1/2014 | |
| CN | 104693636 A | 6/2015 | |
| CN | 105601769 A | 5/2016 | |
| CN | 107075181 A | 8/2017 | |
| JP | 2011-122016 A | 6/2011 | |
| KR | 2000-0055262 A | 9/2000 | |
| KR | 10-2003-0014777 A | 2/2003 | |
| KR | 10-2003-0022947 A | 3/2003 | |
| KR | 20050068557 A | 7/2005 | |
| KR | 10-0574324 B1 | 4/2006 | |
| KR | 100872410 B1 | 12/2008 | |
| KR | 102011-0079634 A | 7/2011 | |
| KR | 10-2016-0135732 A | 11/2016 | |
| KR | 10-2016-0147528 A | 12/2016 | |
| KR | 10-2018-0052849 A | 5/2018 | |
| KR | 10-2018-0080105 A | 7/2018 | |
| WO | WO-2018124562 A1 * | 7/2018 | C08F 2/24 |

OTHER PUBLICATIONS

"Azo Polymerization Initiators Comprehensive Catalog", Fujifilm Wako Chemicals Corporation, 2018.
Supplementary European Search Report for related Application No. EP 20842999.3, mailed Jul. 22, 2022.

* cited by examiner

*Primary Examiner* — Ling Siu Choi
*Assistant Examiner* — David L Miller

(57) ABSTRACT

The present invention provides a method of preparing a graft copolymer, which comprises graft emulsion polymerization of a diene-based rubber polymer with an aromatic vinyl-based monomer and a vinyl cyanide-based monomer in the presence of an azo-based initiator having a solubility in water at 20° C. of 10 g/100 g or more and a 10-hour half-life decomposition temperature in water of 80° C. or less, wherein the graft emulsion polymerization is initiated at 45 to 55° C. According to the present invention, a method of preparing a graft copolymer, which allows polymerization to be performed at low temperatures and ensures excellent polymerization stability, can be provided.

8 Claims, No Drawings

METHOD OF PREPARING GRAFT COPOLYMER

CROSS-REFERENCE TO RELATED APPLICATION

This application is a National Phase of International Application No. PCT/KR2020/009573 which claims priority to and the benefit of Korean Patent Application No. 10-2019-0089775 filed on Jul. 24, 2019, and Korean Patent Application No. 10-2020-0089664, filed on Jul. 20, 2020, the disclosures of which are incorporated herein by reference in their entirety.

TECHNICAL FIELD

The present invention relates to a method of preparing a graft copolymer, and particularly, to a method of preparing a graft copolymer using an azo-based initiator which is water-soluble and has a low 10-hour half-life decomposition temperature in water.

BACKGROUND ART

In the case of diene-based graft copolymers prepared by emulsion polymerization, a redox initiation system has been most widely used as a polymerization initiation system. The redox initiation system exhibits a low polymerization initiation temperature and a high polymerization rate, and thus polymerization can be controlled in a relatively short time.

However, the redox initiation system causes the thermal stability of a graft copolymer to be degraded due to a metal oxide and a reducing agent, and thus the addition of a large amount of antioxidant is required in processing, leading to a degraded whiteness index. In order to solve the above problem, attempts have been made to introduce a pyrolysis initiator such as benzoyl persulfate, potassium persulfate, or the like in polymerization, but there are problems such as a high polymerization initiation temperature, a low polymerization rate, and degradation of the processability and impact resistance of a graft copolymer.

Accordingly, research on a method of preparing a graft copolymer, which realizes a low polymerization initiation temperature and a high polymerization rate and enables the preparation of a graft copolymer with excellent physical properties, is being carried out continuously.

DISCLOSURE

Technical Problem

The present invention is directed to providing a method of preparing a graft copolymer, which is capable of realizing equivalent levels of a polymerization initiation temperature and a polymerization rate to those of a redox initiation system and allows the preparation of a graft copolymer that realizes excellent thermal stability, impact resistance, and color characteristics.

Technical Solution

One aspect of the present invention provides a method of preparing a graft copolymer, which comprises graft emulsion polymerization of a diene-based rubber polymer with an aromatic vinyl-based monomer and a vinyl cyanide-based monomer in the presence of an azo-based initiator having a solubility in water at 20° C. of 10 g/100 g or more and a 10-hour half-life decomposition temperature in water of 80° C. or less, wherein the graft emulsion polymerization is initiated at 45 to 55° C.

Another aspect of the present invention provides a thermoplastic resin molded article which is formed of a thermoplastic resin composition comprising a graft copolymer prepared by the above-described method and has a melt flow index of 18 to 22 g/10 min as measured in accordance with ASTM D1238 at 220° C. and 10 kg, an impact strength of 20 kg·cm/cm or more as measured in accordance with ASTM D256, and a whiteness index of 61 or more as measured in accordance with ASTM D1925.

Advantageous Effects

According to a method of preparing a graft copolymer of the present invention, a low polymerization initiation temperature, a high polymerization rate, and excellent polymerization stability are realized, and thus polymerization efficiency can be substantially improved. In addition, even when an excessive amount of an antioxidant is not used in processing of a graft copolymer, excellent thermal stability can be realized. Additionally, a graft copolymer excellent in all of processability, impact resistance, and color characteristics can be prepared.

MODES OF THE INVENTION

Hereinafter, the present invention will be described in detail with reference to embodiments so that those skilled in the art can easily carry out the present invention. However, the present invention may be embodied in several different forms, and therefore, is not limited to embodiments described herein.

In the present invention, solubility in water means the concentration of a solute in a saturated solution and specifically means the number of grams of an initiator dissolved in 100 g of water, which is a solvent, at 20° C.

In the present invention, a "10-hour half-life decomposition temperature in water" means the temperature required for the content of an azo-based initiator to reduce to 50% based on 10 hours in water.

The 10-hour half-life decomposition temperature in water of an azo-based initiator may be measured by monitoring the thermal activity of a dilute solution containing an azo-based initiator diluted in water using a differential scanning calorimetry (DSC) instrument.

In addition, the half-life of an azo-based initiator may be calculated by the following Arrhenius equation.

$$k_d = A \cdot e^{-Ea/RT}$$

$$t_{1/2} = \ln 2 / k_d$$

$k_d$=reaction rate constant for azo-based initiator dissociation (s$^{-1}$)
A=Arrhenius frequency factor (s$^{-1}$)
$E_a$=activation energy for initiator dissociation (J/mole)
R=gas constant (8.3142 J/mole·K)
T=absolute temperature (K)
$t_{1/2}$=half-life (s)

Meanwhile, the residual concentration of an initiator may be calculated by the following equation.

$$[I] = [I_0] \cdot e^{-k_d \cdot t}$$

[I₀]=original initiator concentration

[I]=initiator concentration at time t t=time measured from the start of decomposition (s)

In the present invention, a diene-based rubber polymer is formed of a conjugated diene-based monomer, and the conjugated diene-based monomer may be one or more selected from the group consisting of 1,3-butadiene, isoprene, chloroprene, and piperylene, with 1,3-butadiene being preferred.

In the present invention, a diene-based rubber polymer may have an average particle diameter of 50 to 500 nm or 70 to 400 nm, with the range of 70 to 400 nm being preferred. When the above-described range is satisfied, a graft copolymer excellent in impact strength and surface gloss characteristics can be formed.

In the present invention, the average particle diameter of a diene-based rubber polymer may refer to an arithmetic average particle diameter in the particle size distribution as measured by a dynamic light scattering method, specifically, an average particle diameter in a scattering intensity distribution. The average particle diameter of a diene-based rubber polymer may be measured using a Nicomp 380 instrument (manufactured by PSS Nicomp).

In the present invention, an aromatic vinyl-based monomer may be one or more selected from the group consisting of styrene, α-methylstyrene, α-ethylstyrene, and p-methylstyrene, with styrene being preferred. A unit derived from the aromatic vinyl-based monomer may be an aromatic vinyl-based monomer unit.

In the present invention, a vinyl cyanide-based monomer may be one or more selected from the group consisting of acrylonitrile, methacrylonitrile, phenylacrylonitrile, and α-chloroacrylonitrile, with acrylonitrile being preferred. A unit derived from the vinyl cyanide-based monomer may be a vinyl cyanide-based monomer unit.

1. Method of Preparing Graft Copolymer

A method of preparing a graft copolymer according to an embodiment of the present invention comprises graft emulsion polymerization of a diene-based rubber polymer with an aromatic vinyl-based monomer and a vinyl cyanide-based monomer in the presence of an azo-based initiator having a solubility in water at 20° C. of 10 g/100 g or more and a 10-hour half-life decomposition temperature in water of 80° C. or less, wherein the graft emulsion polymerization is initiated at 45 to 55° C.

The use of a redox initiation system provides the advantage of a low polymerization initiation temperature and a high polymerization rate, but a metal oxide and a reducing agent, which are used as a redox-based catalyst, cause thermal stability to be degraded. Accordingly, to improve thermal stability, an excessive amount of antioxidant is necessarily used in processing of a graft copolymer, but the excessive amount of antioxidant also causes a whiteness index to be substantially degraded. In addition, when a pyrolysis initiator is used, polymerization efficiency is degraded due to a high polymerization initiation temperature and a low polymerization rate, and the thermal stability, processability, and impact resistance of a graft copolymer are also degraded. In order to solve these problems, the inventors of the present invention have conducted research on an initiator suitable for polymerization of a graft copolymer and found that when an azo-based initiator having a solubility in water at 20° C. of 10 g/100 g or more and a 10-hour half-life decomposition temperature in water of 80° C. or less is used, a graft copolymer excellent in thermal stability, processability, impact resistance, and color characteristics can be prepared while realizing equivalent levels of a polymerization initiation temperature and a polymerization rate to those of a redox initiation system. Based on this fact, the present invention has been completed.

The azo-based initiator may have a solubility in water at 20° C. of 10 g/100 g or more, preferably 10 g/100 g to 40 g/100 g, and more preferably 10 g/100 g to 20 g/100 g. When the above-described condition is satisfied, not only the azo-based initiator is suitable for emulsion polymerization in which water is used as a solvent, but also the amount of an azo-based initiator that may participate in emulsion polymerization is increased compared to a conventional case, and thus a high polymerization rate which is an equivalent level to that of a redox initiation system can be realized, and a polymerization conversion rate can also be increased. In addition, the degree of grafting and weight-average molecular weight of a graft copolymer are increased, and thus impact resistance can be improved. Below the above-described condition, the amount of an azo-based initiator that may participate in polymerization is decreased, and thus a polymerization rate may be decreased, and a polymerization conversion rate may also be degraded, leading to degraded polymerization efficiency.

The azo-based initiator may have a 10-hour half-life decomposition temperature in water of 80° C. or less, preferably 35° C. to 65° C., and more preferably 50° C. to 65° C. When the above-described condition is satisfied, not only the azo-based initiator is suitable for emulsion polymerization in which water is used as a solvent, but also a low polymerization initiation temperature which is an equivalent level to that of a redox initiation system can be realized, and polymerization stability can be improved, resulting in substantially improved polymerization efficiency. Above the above-described temperature condition, a polymerization initiation temperature is increased, and thus polymerization stability may be degraded, leading to degraded polymerization efficiency.

The graft emulsion polymerization may be initiated at 45 to 55° C., and preferably, 47 to 52° C. When the above-described condition is satisfied, it is possible to reduce the energy required to raise the temperature of a reactor, and thus polymerization efficiency can be improved. In addition, the amount of aggregates generated in preparation of a graft copolymer is decreased, and a final polymerization conversion rate is increased, and thus polymerization stability and polymerization efficiency can be improved. Additionally, the thermal stability, impact resistance, and color characteristics of a graft copolymer can be improved. When graft emulsion polymerization is initiated at a temperature below the above-described temperature range, the thermal stability, processability, and color characteristics of a graft copolymer may be degraded. When graft emulsion polymerization is initiated at a temperature above the above-described temperature range, the amount of generated aggregates is increased, and thus polymerization stability and polymerization efficiency may be degraded. Also, the thermal stability, impact resistance, and color characteristics of a graft copolymer may be substantially degraded.

The azo-based initiator may be one or more selected from the group consisting of compounds represented by the following Chemical Formulas 1 to 3:

<Chemical Formula 1>

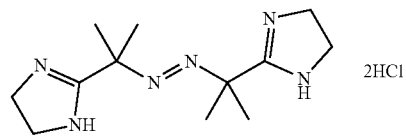

2HCl

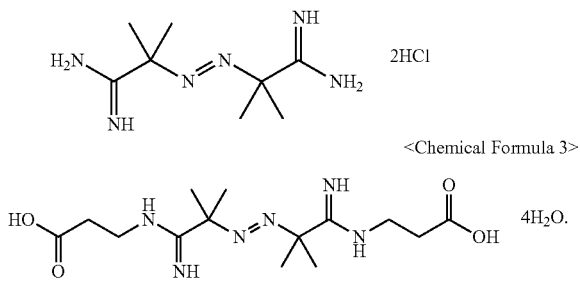

<Chemical Formula 2>

<Chemical Formula 3>

The azo-based initiator may be present in an amount of 0.01 to 0.5 parts by weight, 0.03 to 0.4 parts by weight, or 0.08 to 0.25 parts by weight with respect to 100 parts by weight of the sum of the diene-based rubber polymer, the aromatic vinyl-based monomer, and the vinyl cyanide-based monomer, with the range of 0.08 to 0.25 parts by weight being preferred. When the above-described condition is satisfied, a polymerization conversion rate can be increased due to a high polymerization rate, and the generation of aggregates in a graft copolymer can be minimized due to improved polymerization stability. Also, the thermal stability, processability, impact strength, and whiteness index of a graft copolymer can be improved.

Meanwhile, the diene-based rubber polymer may participate in graft emulsion polymerization in an amount of 45 to 65 parts by weight or 50 to 60 parts by weight with respect to 100 parts by weight of the sum of the diene-based rubber polymer, the aromatic vinyl-based monomer, and the vinyl cyanide-based monomer, with the range of 50 to 60 parts by weight being preferred. When the above-described condition is satisfied, a graft copolymer can realize excellent impact strength and excellent surface gloss characteristics.

The aromatic vinyl-based monomer may participate in graft emulsion polymerization in an amount of 20 to 40 parts by weight or 25 to 35 parts by weight with respect to 100 parts by weight of the sum of the diene-based rubber polymer, the aromatic vinyl-based monomer, and the vinyl cyanide-based monomer, with the range of 25 to 35 parts by weight being preferred. When the above-described condition is satisfied, a graft copolymer can realize excellent processability.

The vinyl cyanide-based monomer may participate in graft emulsion polymerization in an amount of 7 to 20 parts by weight or 10 to 15 parts by weight with respect to 100 parts by weight of the sum of the diene-based rubber polymer, the aromatic vinyl-based monomer, and the vinyl cyanide-based monomer, with the range of 10 to 15 parts by weight being preferred. When the above-described condition is satisfied, a graft copolymer can realize excellent chemical resistance.

Meanwhile, the method of preparing a graft copolymer may comprise: initiating emulsion polymerization by primarily adding the diene-based rubber polymer, the aromatic vinyl-based monomer, the vinyl cyanide-based monomer, and the azo-based initiator to a reactor; and performing emulsion polymerization by continuously secondarily adding the aromatic vinyl-based monomer, the vinyl cyanide-based monomer, and the azo-based initiator to the reactor.

In the step of initiating emulsion polymerization and the step of performing emulsion polymerization, the azo-based initiator may be added to the reactor in a weight ratio of 1:1 to 1:3, 1:1 to 1:2.5, or 1:1.5 to 1:2.5, with the range of 1:1.5 to 1:2.5 being preferred. When the above-described condition is satisfied, a polymerization conversion rate can be increased, and polymerization can be stably performed due to ease of heat control.

In the step of initiating emulsion polymerization and the step of performing emulsion polymerization, the aromatic vinyl-based monomer may be added to the reactor in a weight ratio of 1:3 to 1:12 or 1:5 to 1:10, with the range of 1:5 to 1:10 being preferred. When the above-described condition is satisfied, a graft copolymer can ensure an excellent degree of grafting.

In the step of initiating emulsion polymerization and the step of performing emulsion polymerization, the vinyl cyanide-based monomer may be added to the reactor in a weight ratio of 1:3 to 1:12 or 1:5 to 1:10, with the range of 1:5 to 1:10 being preferred. When the above-described condition is satisfied, a graft copolymer can ensure an excellent degree of grafting.

In the step of initiating emulsion polymerization and the step of performing emulsion polymerization, one or more selected from the group consisting of an emulsifier, a molecular weight controlling agent, and water may be further added.

The emulsifier may be one or more selected from the group consisting of alkali metal salts of rosin acid, alkali metal salts of fatty acids, and alkali metal salts of a fatty acid dimer, with alkali metal salts of a fatty acid dimer being preferred. The alkali metal salts of rosin acid may be one or more selected from the group consisting of potassium rosinate and sodium rosinate, with potassium rosinate being preferred. The alkali metal salts of fatty acids may be alkali metal salts of $C_8$ to $C_{20}$ fatty acids, and one or more selected from the group consisting of alkali metal salts of capric acid, alkali metal salts of lauric acid, alkali metal salts of palmitic acid, alkali metal salts of stearic acid, alkali metal salts of oleic acid, and alkali metal salts of linoleic acid are more preferred. The alkali metal salts of a fatty acid dimer may be alkali metal salts of a $C_8$ to $C_{20}$ fatty acid dimer, and potassium salts a $C_8$ to $C_{20}$ fatty acid dimer is preferred, and a potassium oleate dimer is more preferred.

The emulsifier may be added in an amount of 0.1 to 1 part by weight or 0.2 to 0.7 parts by weight with respect to 100 parts by weight of the sum of the diene-based rubber polymer, the aromatic vinyl-based monomer, and the vinyl cyanide-based monomer, with the range of 0.2 to 0.7 parts by weight being preferred. When the emulsifier is added within the above-described range, excellent polymerization stability can be achieved while appropriately maintaining a polymerization rate. Also, discoloration and gas generation, which are caused by the emulsifier, can be minimized.

In the step of initiating emulsion polymerization and the step of performing emulsion polymerization, the emulsifier may be added in a weight ratio of 1:1 to 1:7 or 1:2 to 1:5, with the range of 1:2 to 1:5 being preferred. When the emulsifier is added within the above-described range, excellent polymerization stability can be achieved while appropriately maintaining a polymerization rate.

The molecular weight controlling agent may be one or more selected from the group consisting of t-dodecyl mercaptan, n-dodecyl mercaptan, n-octyl mercaptan, and an α-methylstyrene dimer, with one or more selected from the group consisting of t-dodecyl mercaptan and an α-methylstyrene dimer being preferred.

The molecular weight controlling agent may be added in an amount of 0.1 to 0.5 parts by weight or 0.1 to 0.3 parts by weight with respect to 100 parts by weight of the sum of the diene-based rubber polymer, the aromatic vinyl-based monomer, and the vinyl cyanide-based monomer, with the range of 0.1 to 0.3 parts by weight being preferred. When added within the above-described range, the molecular weight controlling agent can serve as not only a molecular weight controlling agent but also a polymerization accelerator while appropriately maintaining a polymerization rate.

In the step of initiating emulsion polymerization and the step of performing emulsion polymerization, the molecular weight controlling agent may be added in a weight ratio of 1:1 to 1:7 or 1:2 to 1:5, with the range of 1:2 to 1:5 being preferred. When added within the above-described range, the molecular weight controlling agent can also serve as a polymerization accelerator while appropriately maintaining a polymerization rate.

2. Thermoplastic Resin Molded Article

A thermoplastic resin molded article according to another embodiment of the present invention is formed of a thermoplastic resin composition comprising a copolymer prepared by the method of preparing a graft copolymer according to an embodiment of the present invention and has a melt flow index of 18 to 22 g/10 min as measured in accordance with ASTM D1238 at 220° C. and 10 kg, an impact strength of 20 kg·cm/cm or more as measured in accordance with ASTM D256, and a whiteness index of 61 or more as measured in accordance with ASTM D1925.

The thermoplastic resin molded article preferably has a melt flow index of 19 to 21 g/10 min, an impact strength of 20 to 23 kg·cm/cm, and a whiteness index of 61 to 64. When the above-described conditions are satisfied, a thermoplastic resin molded article excellent in all of processability, impact resistance, and color characteristics can be formed.

The thermoplastic resin composition may comprise a non-grafted copolymer comprising an aromatic vinyl-based monomer unit and a vinyl cyanide-based monomer unit.

The thermoplastic resin composition may comprise the graft copolymer and the non-grafted copolymer in a weight ratio of 10:90 to 40:60, and preferably, 20:80 to 30:70. When the above-described range is satisfied, a thermoplastic resin composition excellent in processability and impact resistance can be prepared.

The non-grafted copolymer may comprises the vinyl-based monomer unit and the vinyl cyanide-based monomer unit in a weight ratio of 60:40 to 80:20, and preferably, 65:35 to 75:25. When the above-described condition is satisfied, a thermoplastic resin composition excellent in processability and chemical resistance can be prepared.

The non-grafted copolymer is preferably a styrene/acrylonitrile non-grafted copolymer.

Hereinafter, the present invention will be described in detail with reference to embodiments so that those skilled in the art can easily carry out the present invention. However, the present invention may be embodied in several different forms, and therefore, is not limited to embodiments described herein.

Information on initiators used in Examples and Comparative Examples is as follows.

(A) Initiators (A-1) VA-044 commercially available from FUJIFILM Wako Pure Chemical Corporation was used.
Structure:

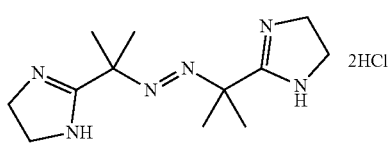 [SMILES: CC(C)(/N=N/C(C)(C)C1=NCCN1)C1=NCCN1]

2HCl

Solubility in water at 20° C.: 35.2 g/100 g
10-hour half-life decomposition temperature in water: 44° C.

(A-2) VA-050 commercially available from FUJIFILM Wako Pure Chemical Corporation was used.
Structure:

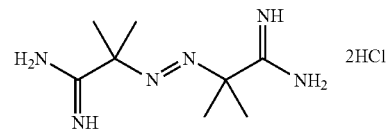

2HCl

Solubility in water at 20° C.: 23.2 g/100 g
10-hour half-life decomposition temperature in water: 56° C.

(A-3) VA-057 commercially available from FUJIFILM Wako Pure Chemical Corporation was used.
Structure:

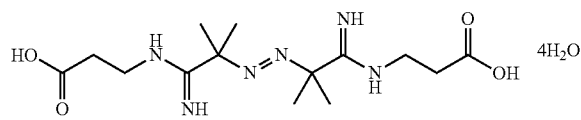 [SMILES: CC(C)(/N=N/C(C)(C)C(=N)NCCC(=O)O)C(=N)NCCC(=O)O]

4H$_2$O

Solubility in water at 20° C.: 14 g/100 g
10-hour half-life decomposition temperature in water: 57° C.

(A-4) VA-061 commercially available from FUJIFILM Wako Pure Chemical Corporation was used.
Structure:

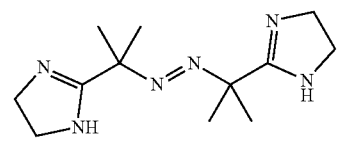 [SMILES: CC(C)(/N=N/C(C)(C)C1=NCCN1)C1=NCCN1]

Solubility in water at 20° C.: 0.5 g/100 g
10-hour half-life decomposition temperature in methanol: 61° C.

(A-5) VA-501 commercially available from FUJIFILM Wako Pure Chemical Corporation was used.
Structure:

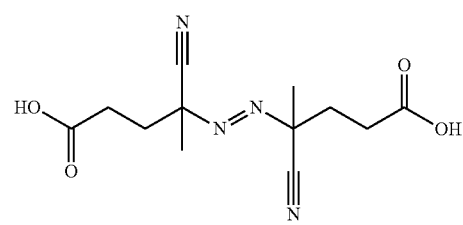 [SMILES: CC(C#N)(CCC(=O)O)/N=N/C(C)(C#N)CCC(=O)O]

Solubility in water at 20° C.: 0.1 g/100 g
10-hour half-life decomposition temperature in water: 69° C.

(A-6) VA-086 commercially available from FUJIFILM Wako Pure Chemical Corporation was used.

Structure:

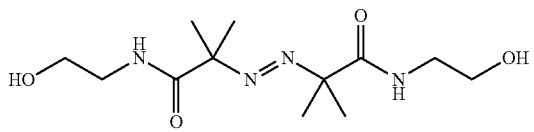 [SMILES: CC(C)(/N=N/C(C)(C)C(=O)NCCO)C(=O)NCCO]

Solubility in water at 20° C.: 2.4 g/100 g
10-hour half-life decomposition temperature in water: 86° C.
(A-7) V-65 commercially available from FUJIFILM Wako Pure Chemical Corporation was used.
Structure:

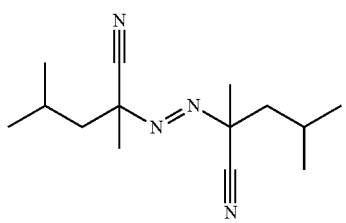 [SMILES: CC(C)CC(C)(C#N)/N=N/C(C)(C#N)CC(C)C]

Solubility in water at 20° C.: <0.1 g/100 g
10-hour half-life decomposition temperature in toluene: 51° C.
(A-8) AIBN commercially available from FUJIFILM Wako Pure Chemical Corporation was used.
Structure:

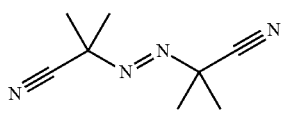

Solubility in water at 20° C.: <0.1 g/100 g
10-hour half-life decomposition temperature in toluene: 65° C.
(A-9) Benzoyl peroxide was used.
(A-10) Potassium persulfate was used.
(A-11) Cumene hydroperoxide was used.

Examples 1 to 7 and Comparative Examples 1 to 9

<Preparation of Graft Copolymer>
120 parts by weight of ion exchanged water, 55 parts by weight (based on solid content) of butadiene rubber polymer latex (average particle diameter: 300 nm), 3.5 parts by weight of styrene, 1.5 parts by weight of acrylonitrile, 0.1 parts by weight of potassium rosinate, 0.1 parts by weight of t-dodecyl mercaptan, and an initiator of types and contents shown in Tables 1 to 4 below were primarily added to a nitrogen-filled reactor, and then polymerization was initiated by raising the temperature of the reactor to temperatures shown in Tables 1 to 4 below.
Meanwhile, 28 parts by weight of styrene, 12 parts by weight of acrylonitrile, 0.4 parts by weight of potassium rosinate, 0.3 parts by weight of t-dodecyl mercaptan, and an initiator of types and contents shown in Tables 1 to 4 below were uniformly mixed to prepare a polymerization solution.
While the temperature of the reactor was raised to 80° C. at a predetermined rate at the same time as initiating polymerization, polymerization was performed by continuously secondarily adding the polymerization solution to the reactor for 3 hours, and then terminated to obtain a graft copolymer latex. 0.4 parts by weight of Wingstay L commercially available from DAEYOUNG Industrial Co., Ltd. was added to the graft copolymer latex. Then, the graft copolymer latex was subjected to coagulation with 2 parts by weight of sulfuric acid, aging, dehydration, and drying to prepare a graft copolymer powder having a water content of less than 1 wt %.
<Preparation of Thermoplastic Resin Composition>
25 parts by weight of the graft copolymer powder and 75 parts by weight of 92HR (commercially available from LG Chem Ltd., styrene/acrylonitrile copolymer) were uniformly mixed to prepare a thermoplastic resin composition.

Comparative Example 10

<Preparation of Graft Copolymer>
120 parts by weight of ion exchanged water, 55 parts by weight (based on solid content) of butadiene rubber polymer latex (average particle diameter: 300 nm), 3.5 parts by weight of styrene, 1.5 parts by weight of acrylonitrile, 0.1 parts by weight of potassium rosinate, 0.1 parts by weight of t-dodecyl mercaptan, 0.15 parts by weight of dextrose, 0.1 parts by weight of sodium pyrophosphate, 0.001 parts by weight of ferrous sulfate, and an initiator of a type and a content shown in Table 4 below were primarily added to a nitrogen-filled reactor, and then polymerization was initiated by raising the temperature of the reactor to a temperature shown in Table 4 below.
Meanwhile, 28 parts by weight of styrene, 12 parts by weight of acrylonitrile, 0.4 parts by weight of potassium rosinate, 0.3 parts by weight of t-dodecyl mercaptan, and an initiator of a type and a content shown in Table 4 below were uniformly mixed to prepare a polymerization solution.
While the temperature of the reactor was raised to 80° C. at a predetermined rate, polymerization was performed by continuously secondarily adding the polymerization solution to the reactor for 3 hours, and then terminated to obtain a graft copolymer latex. 0.3 parts by weight of an antioxidant (Wingstay L commercially available from DAEYOUNG Industrial Co., Ltd.) was added to the graft copolymer latex. Then, the graft copolymer latex was subjected to coagulation with 2 parts by weight of sulfuric acid, aging, dehydration, and drying to prepare a graft copolymer powder having a water content of less than 1 wt %.
<Preparation of Thermoplastic Resin Composition>
25 parts by weight of the graft copolymer powder and 75 parts by weight of 92HR (commercially available from LG Chem Ltd., styrene/acrylonitrile copolymer) were uniformly mixed to prepare a thermoplastic resin composition.

Comparative Example 11

A graft copolymer powder and a thermoplastic resin composition were prepared in the same manner as in Comparative Example 10 except that an antioxidant (Wingstay L commercially available from DAEYOUNG Industrial Co., Ltd.) was added in an amount of 0.8 parts by weight instead of 0.3 parts by weight.

Experimental Example 1

Physical properties of the graft copolymer latex and powder of Examples and Comparative Examples were measured by methods described below, and results thereof are shown in Tables 1 to 4 below.

(1) Polymerization conversion rate (%): determined by drying 5 g of the graft copolymer latex in a hot-air dryer set at 150° C. for 15 minutes, taking a solid content, obtaining the concentration of the whole solid content with respect to initial latex (measurement value TSC), and calculating a polymerization conversion rate of monomers using the obtained concentration.

Polymerization conversion rate (%)=[(Total content (parts by weight) of monomers, supplementary materials, and ion exchanged water which were added in polymerization)×(measurement value TSC)]–(Total content (parts by weight) of unreacted monomers and unreacted supplementary materials)

(2) Amount of aggregates (wt %): The graft copolymer latex was filtered through a 100-mesh sieve, placed in a convection oven, and allowed to stand at 80° C. for 720 minutes. Afterward, aggregates filtered on the 100-meth sieve were weighed, and the amount of aggregates for the graft copolymer latex was calculated by the following equation.

Amount of aggregate (wt %)={(Weight of aggregates filtered on 100-mesh sieve)/(Total theoretical weight of butadiene rubber polymer, styrene, acrylonitrile, and additives which were added in preparation of graft copolymer)}×100

(3) Oxidative induction time (min): determined in accordance with ASTM D3895 by measuring the time taken for oxidation to occur while flowing 50 ml of oxygen per min under an isothermal condition of 190° C. by means of differential scanning calorimetry (DSC).

Experimental Example 2

Each of the thermoplastic resin compositions of Examples and Comparative Examples was extruded to prepare a pellet. A physical property of the pellet was measured by a method described below, and results thereof are shown in Tables 1 to 4 below.

(4) Melt flow index (g/10 min): measured in accordance with ASTM D1238 at 220° C. and 10 kg.

Experimental Example 3

Each of the thermoplastic resin compositions of Examples and Comparative Examples was extruded and injection-molded to prepare a specimen. Physical properties of the specimen were measured by methods described below, and results thereof are shown in Tables 1 to 4 below.

(5) Izod impact strength (kg·cm/cm, ¼ In): measured in accordance with ASTM D256.

(6) Whiteness index: measured in accordance with ASTM D1925.

TABLE 1

| | | | Examples | | | | |
|---|---|---|---|---|---|---|---|
| Classification | | | 1 | 2 | 3 | 4 | 5 |
| (A) Initiator (parts by weight) | (A-1) | Primary addition | 0.05 | — | — | — | — |
| | | Secondary addition | 0.1 | — | — | — | — |
| | (A-2) | Primary addition | — | 0.05 | — | — | — |
| | | Secondary addition | — | 0.1 | — | — | — |
| | (A-3) | Primary addition | — | — | 0.025 | 0.05 | 0.1 |
| | | Secondary addition | — | — | 0.05 | 0.1 | 0.2 |
| Polymerization initiation temperature (° C.) | | | 50 | 50 | 50 | 50 | 50 |
| Graft copolymer | Polymerization conversion rate (%) | | 98.1 | 97.7 | 96.5 | 98.0 | 98.0 |
| | Amount of aggregates (wt %) | | 0.01 | 0.01 | 0.025 | 0.02 | 0.05 |
| | Oxidative induction time (min) | | 88 | 73 | 80 | 82 | 67 |
| Thermoplastic resin composition | Melt flow index (g/10 min) | | 19 | 19 | 18 | 20 | 21 |
| | Impact strength (kg · cm/cm) | | 22.8 | 22.1 | 20.1 | 22.5 | 18.8 |
| | Whiteness index | | 63 | 64 | 63 | 63 | 61 |

TABLE 2

| | | | Examples | | Comparative Examples | |
|---|---|---|---|---|---|---|
| Classification | | | 6 | 7 | 1 | 2 |
| (A) Initiator (parts by weight) | (A-1) | Primary addition | 0 | 0 | 0 | 0 |
| | | Secondary addition | 0 | 0 | 0 | 0 |

TABLE 2-continued

|  |  |  | Examples | | Comparative Examples | |
|---|---|---|---|---|---|---|
| Classification | | | 6 | 7 | 1 | 2 |
| | (A-2) | Primary addition | 0 | 0 | 0 | 0 |
| | | Secondary addition | 0 | 0 | 0 | 0 |
| | (A-3) | Primary addition | 0.05 | 0.05 | 0.05 | 0.05 |
| | | Secondary addition | 0.1 | 0.1 | 0.1 | 0.1 |
| Polymerization initiation temperature (° C.) | | | 45 | 55 | 44 | 56 |
| Graft copolymer | Polymerization conversion rate (%) | | 97.7 | 98.1 | 96.3 | 98.0 |
| | Amount of aggregates (wt %) | | 0.014 | 0.015 | 0.012 | 0.09 |
| | Oxidative induction time (min) | | 79 | 79 | 51 | 62 |
| Thermoplastic resin composition | Melt flow index (g/10 min) | | 19 | 20 | 16 | 22 |
| | Impact strength (kg · cm/cm) | | 22.8 | 22.4 | 22.1 | 17.7 |
| | Whiteness index | | 63 | 63 | 58 | 61 |

TABLE 3

|  |  |  | Comparative Examples | | | | |
|---|---|---|---|---|---|---|---|
| Classification | | | 3 | 4 | 5 | 6 | 7 |
| (A) Initiator (parts by weight) | (A-4) | Primary addition | 0.05 | — | — | — | — |
| | | Secondary addition | 0.1 | — | — | — | — |
| | (A-5) | Primary addition | — | 0.05 | — | — | — |
| | | Secondary addition | — | 0.1 | — | — | — |
| | (A-6) | Primary addition | — | — | 0.05 | — | — |
| | | Secondary addition | — | — | 0.1 | — | — |
| | (A-7) | Primary addition | — | — | — | 0.05 | — |
| | | Secondary addition | — | — | — | 0.1 | — |
| | (A-8) | Primary addition | — | — | — | — | 0.04 |
| | | Secondary addition | — | — | — | — | 0.08 |
| Polymerization initiation temperature (° C.) | | | 50 | 50 | 50 | 50 | 70 |
| Graft copolymer | Polymerization conversion rate (%) | | 83.2 | 85.3 | 96.7 | 88.2 | 95.5 |
| | Amount of aggregates (wt %) | | 1.7 | 1.3 | 0.02 | 2.3 | 1.9 |
| | Oxidative induction time (min) | | 51 | 48 | 76 | 52 | 61 |
| Thermoplastic resin composition | Melt flow index (g/10 min) | | 12 | 13 | 16 | 14 | 13 |
| | Impact strength (kg · cm/cm) | | 16.8 | 18.1 | 19.8 | 18.8 | 18.5 |
| | Whiteness index | | 61 | 61 | 62 | 60 | 60 |

TABLE 4

| Classification | | | Comparative Examples | | | |
|---|---|---|---|---|---|---|
| | | | 8 | 9 | 10 | 11 |
| (A) Initiator | (A-9) | Primary addition | 0.05 | — | — | — |
| | | Secondary addition | 0.1 | — | — | — |
| | (A-10) | Primary addition | — | 0.05 | — | — |
| | | Secondary addition | — | 0.1 | — | — |
| | (A-11) | Primary addition | — | — | 0.05 | 0.05 |
| | | Secondary addition | — | — | 0.1 | 0.1 |
| Polymerization initiation temperature (° C.) | | | 70 | 70 | 50 | 50 |
| Graft copolymer | Polymerization conversion rate (%) | | 92.5 | 97.9 | 97.5 | 97.5 |
| | Amount of aggregates (wt %) | | 2.1 | 0.05 | 0.03 | 0.03 |
| | Oxidative induction time (min) | | 55 | 70 | 18 | 45 |
| Thermoplastic resin composition | Melt flow index (g/10 min) | | 12 | 7 | 21 | 20 |
| | Impact strength (kg · cm/cm) | | 10.7 | 7.2 | 22.1 | 21.6 |
| | Whiteness index | | 61 | 53 | 58 | 56 |

Referring to Tables 1 to 4, the graft copolymers of Examples 1 to 7, which used an azo-based initiator having a solubility in water at 20° C. of 10 g/100 g or more and a 10-hour half-life decomposition temperature in water of 80° C. or less, exhibited high polymerization conversion rates and small amounts of aggregates, and thus the polymerization stability and polymerization efficiency thereof were excellent. Also, the graft copolymers of Examples 1 to 7 exhibited excellent polymerization stability due to having small amounts of aggregates and excellent thermal stability due to having long oxidative induction times. Also, the thermoplastic resin compositions of Examples 1 to 7 exhibited high melt flow indices, high impact strength, and high whiteness indices, and thus the processability, impact resistance, and color characteristics thereof were excellent. Meanwhile, when Examples 4, 6, and 7 and Comparative Examples 1 and 2 were compared, the graft copolymers of Examples 4, 6 and 7, which were prepared by initiating polymerization at 45 to 55° C., exhibited long oxidative induction times, and thus the thermal stability thereof was excellent. Also, the thermoplastic resin compositions of Examples 4, 6 and 7 exhibited high melt flow indices, high impact strength, and high whiteness indices, and thus the processability, impact resistance, and color characteristics thereof were excellent. However, the graft copolymer of Comparative Example 1, which was prepared by initiating polymerization at 44° C., exhibited a short oxidative induction time, and thus the thermal stability thereof was not excellent. The thermoplastic resin composition of Comparative Example 1 exhibited a low melt flow index and a low whiteness index, and thus the processability and color characteristics thereof were not excellent. Also, the graft copolymer of Comparative Example 2, which was prepared by initiating polymerization at 56° C. exhibited a short oxidative induction time, and thus the thermal stability thereof was not excellent. Also, the thermoplastic resin composition of Comparative Example 2 exhibited low impact strength, and thus the impact resistance thereof was not excellent.

The graft copolymer of Comparative Example 3, which was prepared using an azo-based initiator having a solubility in water at 20° C. of 0.5 g/100 g, exhibited a low polymerization conversion rate and a large amount of aggregates, and thus the polymerization efficiency thereof was low. Also, the graft copolymer exhibited a short oxidative induction time, and thus the thermal stability thereof was not excellent. The thermoplastic resin composition of Comparative Example 3 exhibited a low melt flow index and low impact strength, and thus the processability and impact resistance thereof were not excellent.

The graft copolymer of Comparative Example 4, which was prepared using an azo-based initiator having a solubility in water at 20° C. of 0.1 g/100 g, exhibited a low polymerization conversion rate and a large amount of aggregates, and thus the polymerization efficiency thereof was low. Also, the graft copolymer exhibited a short oxidative induction time, and thus the thermal stability thereof was not excellent. The thermoplastic resin composition of Comparative Example 4 exhibited a low melt flow index and low impact strength, and thus the processability and impact resistance thereof were not excellent.

The thermoplastic resin composition of Comparative Example 5, which included a graft copolymer prepared using an azo-based initiator having a solubility in water at 20° C. of 2.4 g/100 g and a 10-hour half-life decomposition temperature in water of 86° C., exhibited a low melt flow index and low impact strength, and thus the processability and impact resistance thereof were not excellent.

The graft copolymer of Comparative Example 6, which was prepared using an azo-based initiator having a solubility in water at 20° C. of less than 0.1 g/100 g, exhibited a low polymerization conversion rate and a large amount of aggregates, and thus the polymerization efficiency thereof was low. Also, the graft copolymer exhibited a short oxidative induction time, and thus the thermal stability thereof was not excellent. The thermoplastic resin composition of Comparative Example 6 exhibited a low melt flow index and low impact strength, and thus the processability and impact resistance thereof were not excellent.

The graft copolymer of Comparative Example 7, which was prepared by using an azo-based initiator having a solubility in water at 20° C. of less than 0.1 g/100 g and initiating graft emulsion polymerization at 70° C., exhibited a large amount of aggregates, and thus the polymerization stability and polymerization efficiency thereof were degraded. Also, the graft copolymer of Comparative Example 7 exhibited a short oxidative induction time, and thus the thermal stability thereof was not excellent. The thermoplastic resin composition of Comparative Example 7 exhibited a low melt flow index and low impact strength, and thus the processability and impact resistance thereof were not excellent.

The graft copolymer of Comparative Example 8, which was prepared by using benzoyl peroxide and initiating graft emulsion polymerization at 70° C., exhibited a large amount of aggregates, and thus the polymerization stability and polymerization efficiency thereof were degraded. Also, the graft copolymer exhibited a short oxidative induction time, and thus the thermal stability thereof was not excellent. The thermoplastic resin composition of Comparative Example 8 exhibited a low melt flow index and low impact strength, and thus the processability and impact resistance thereof were not excellent.

The thermoplastic resin composition of Comparative Example 9, which included a graft copolymer prepared by using potassium persulfate and initiating graft emulsion polymerization at 70° C., exhibited a low melt flow index, low impact strength, and a low whiteness index, and thus the processability, impact resistance, and color characteristics were not excellent.

The graft copolymer of Comparative Example 10, which was prepared using cumene hydroperoxide, exhibited a short oxidative induction time, and thus the thermal stability thereof was not excellent. The thermoplastic resin composition of Comparative Example 10 exhibited a low whiteness index, and thus the color characteristics thereof was not excellent.

Although the graft copolymer of Comparative Example 11 was prepared by graft emulsion polymerization in the same manner as the graft copolymer of Comparative Example 10, it was a graft copolymer prepared by adding an excessive amount of antioxidant in a post-treatment process, and the oxidative induction time thereof was prolonged compared to the graft copolymer of Comparative Example 10, but was shorter compared to the graft copolymers of Examples 1 to 7. Also, the thermoplastic resin composition of Comparative Example 11 exhibited slightly degraded impact strength and a slightly degraded whiteness index compared to the thermoplastic resin composition of Comparative Example 10.

The invention claimed is:

1. A method of preparing a graft copolymer, comprising:
   initiating graft emulsion polymerization by primarily adding a diene-based rubber polymer, an aromatic vinyl-based monomer, a vinyl cyanide-based monomer and an azo initiator to a reactor; and
   performing graft emulsion polymerization by continuously secondarily adding the aromatic vinyl-based monomer, the vinyl cyanide-based monomer, and the azo initiator to the reactor;
   wherein the azo initiator has a solubility in water at 20° C. of 10 g/100 g or more and a 10-hour half-life decomposition temperature in water of 80° C. or less,
   wherein the graft emulsion polymerization is initiated at 45 to 55° C.,
   wherein the diene-based rubber polymer is formed of a conjugated diene-based monomer, and the conjugated diene-based monomer is one or more selected from the group consisting of 1,3-butadiene, isoprene, chloroprene, and piperylene,
   wherein the aromatic vinyl-based monomer is one or more selected from the group consisting of styrene, α-methylstyrene, α-ethylstyrene, and p-methylstyrene,
   wherein the vinyl cyanide-based monomer is one or more selected from the group consisting of acrylonitrile, methacrylonitrile, phenylacrylonitrile, and α-chloroacrylonitrile.

2. The method of claim 1, wherein the azo initiator has a solubility in water at 20° C. of 10 g/100 g to 40 g/100 g.

3. The method of claim 1, wherein the azo initiator has a 10-hour half-life decomposition temperature in water of 35° C. to 65° C.

4. The method of claim 1, wherein the azo initiator is one or more selected from the group consisting of compounds represented by the following Chemical Formulas 1 to 3:

<Chemical Formula 1>

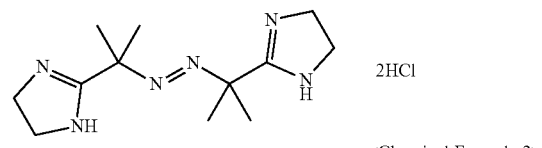

2HCl

<Chemical Formula 2>

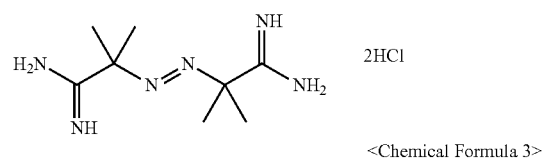

2HCl

<Chemical Formula 3>

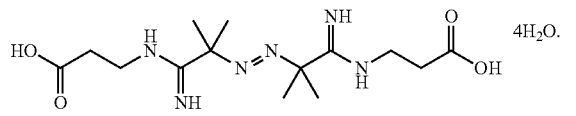

4H$_2$O.

5. The method of claim 1, wherein the azo initiator is present in an amount of 0.01 to 0.5 parts by weight with respect to 100 parts by weight of the sum of the diene-based rubber polymer, the aromatic vinyl-based monomer, and the vinyl cyanide-based monomer.

6. The method of claim 1, wherein the azo initiator in the initiation of emulsion polymerization and the performance of emulsion polymerization is added to the reactor in a weight ratio of 1:1 to 1:3.

7. The method of claim 1, wherein the aromatic vinyl-based monomer in the initiation of emulsion polymerization and the performance of emulsion polymerization is added to the reactor in a weight ratio of 1:3 to 1:12.

8. The method of claim 1, wherein the vinyl cyanide-based monomer in the initiation of emulsion polymerization and the performance of emulsion polymerization is added to the reactor in a weight ratio of 1:3 to 1:12.

* * * * *